United States Patent [19]
Ramey et al.

[11] 3,969,316
[45] July 13, 1976

[54] 3,5-DIALKYL-4-HYDROXYPHENYLALKYL SUBSTITUTED PIPERAZINE DIONES AND POLYMERIC COMPOSITIONS STABILIZED THEREBY

[75] Inventors: Chester E. Ramey, Spring Valley; John J. Luzzi, Carmel, both of N.Y.

[73] Assignee: Ciba-Geigy Corporation, Ardsley, N.Y.

[22] Filed: Oct. 15, 1975

[21] Appl. No.: 622,553

Related U.S. Application Data

[60] Division of Ser. No. 378,472, July 12, 1973, Pat. No. 3,919,234, which is a continuation-in-part of Ser. No. 237,981, March 24, 1972, abandoned.

[52] U.S. Cl. .................. 260/45.8 N; 260/268 DK; 260/268 TR
[51] Int. Cl.$^2$ ................ C07D 241/08; C08K 55/34
[58] Field of Search ................ 260/268 DK, 45.8 N

[56] References Cited
UNITED STATES PATENTS
3,919,234    11/1975    Ramey et al................ 260/268 TR Primary Examiner—Alton D. Rollins
Assistant Examiner—Jose Tovar
Attorney, Agent, or Firm—Charles W. Vanecek

[57] ABSTRACT 3,5-dialkyl-4-hydroxyphenylalkyl substituted piperazine diones are stabilizers for synthetic polymeric materials normally subject to deterioration caused by ultraviolet light. The compounds are prepared by the alkylation reaction between a substituted piperazine dione and 3,5-dialkyl-4-hydroxyphenylalkyl halide. Polymeric compositions containing these stabilizers may also contain a hindered phenolic compound. A typical embodiment is 15-(3',5'-di-t-butyl-4'-hydroxybenzyl)(7,15-diazadispiro[5,1,5,3]hexadecane-14,16-dione).

5 Claims, No Drawings

3,5-DIALKYL-4-HYDROXYPHENYLALKYL SUBSTITUTED PIPERAZINE DIONES AND POLYMERIC COMPOSITIONS STABILIZED THEREBY

This is a Divisional of application Ser. No. 378,472 filed on July 12, 1973, now U.S. Pat. No. 3,919,234 issued Nov. 11, 1975, which is a continuation-in-part of application Ser. Number 237,981 filed on Mar. 24, 1972, now abandoned.

BACKGROUND OF THE INVENTION

This invention relates to the stabilization of organic material normally tending to deteriorate. In particular, the invention relates to the protection of synthetic polymers against the harmful degradative effects, such as discoloration and embrittlement caused by exposure to light, especially ultraviolet light.

It is known that actinic radiation, particularly in the near ultraviolet region, has a deleterious effect on both the appearance and properties of organic polymers. For example, normally colorless or light colored polyesters yellow on exposure to sunlight as do such cellulosics as cellulose acetate. Polystyrene discolors and cracks, with accompanying loss of its desirable physical properties when exposed to actinic light, while vinyl resins, such as polyvinyl chloride and polyvinyl acetate spot and degrade. The rate of air oxidation of polyolefins such as polyethylene and polypropylene is materially accelerated by ultraviolet light.

It has been proposed to stabilize polymeric materials against ultraviolet light deterioration by the use of various types of ultraviolet absorbers. Thus, U.S. Pat. No. 3,004,896 discloses for this purpose 2(2-hydroxyphenylbenzotriazole derivatives, while U.S. Pat. No. 3,189,630 discloses certain metal salts of hydroxybenzoic acids which are useful as actinic stabilizers in synthetic polymers.

The present invention is directed to a class of ultraviolet light stabilizers which consist of a compound of the formula

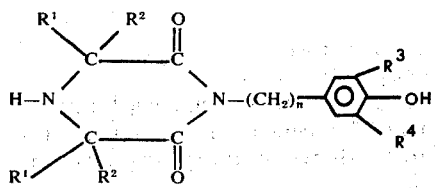

wherein
$R^1$ and $R^2$ are independently of each other methyl or ethyl or together with the carbon to which they are bound form a cyclopentyl or cyclohexyl ring, which is unsubstituted or substituted with a methyl group;
$n$ is an integer of from 1 to 4, and
each of $R^3$ and $R^4$ is the same or different (lower) alkyl group containing from 1 to 8 carbon atoms wherein at least one said alkyl group is branched on the $\alpha$ carbon atom.

By the term alkyl as represented by $R^1$ and $R^2$ is intended methyl or ethyl, with methyl being the preferred substituent. Representative of the cycloalkyl groups, as represented by $R^1$ and $R^2$, are cyclohexyl, cyclopentyl, 2-methyl, 3-methyl and 4-methylcyclohexyl, and 2-methyl and 3-methylcyclopentyl. The preferred cycloalkyl groups are cyclohexyl and 2-methylcyclohexyl.

Each of the groups $R^3$ and $R^4$ is the same or different (lower) alkyl group of from 1 to 8 carbon atoms, wherein at least ony of said alkyl groups is branched on the $\alpha$ carbon atom, i.e., methyl, ethyl, n-propyl, isopropyl, n-butyl, secondary butyl, tertiary butyl, t-amyl, t-hexyl, t-octyl and the like. The preferred groups are tertiary butyl, t-amyl, t-hexyl and t-octyl. The most preferred group is t-butyl.

The invention also relates to compositions of matter which are stabilized against ultraviolet light deterioration which comprises a synthetic organic polymer normally subject to ultraviolet deterioration containing from about 0.005% to 5% by weight of the polymer of the compounds of formula I and preferably from 0.015 to 2% by weight.

The 3,5-dialkyl-4-hydroxyphenylalkyl substituted piperazine dione derivatives as represented by formula I can be used in combination with other light stabilizers such as 2-(2-hydroxyphenyl)benzotriazoles, 2-hydroxybenzophenones, nickel complexes and benzoates.

The stabilizers of this invention are suitable for the protection of many synthetic polymers from the deleterious effects of light. Homopolymers, copolymers, and mixtures thereof are embraced within the scope of substrates which may be stabilized with the stabilizers of this invention, along which may be mentioned, polystyrene and including homopolystyrene and copolymers with acrylonitrile and/or butadiene; vinyl resins formed from the polymerization of vinyl halides or from copolymeriazation of vinyl halides with unsaturated polymerizable compounds, for example, vinyl esters, $\alpha,\beta$-unsaturated acids, $\alpha,\beta$-unsaturated esters, and unsaturated hydrocarbons such as butadienes and styrene; poly-$\alpha$-olefins such as high and low density polyethylene, cross-linked polyethylene, polypropylene, poly(4-methyl-pentene-1), polybutene-1, and the like including copolymers of poly-$\alpha$-olefins such as ethylene-propylene copolymers, and the like; polybutadiene; polyisoprene; polyurethanes such as are prepared from polyols and organic polyisocyanate; polyamides such as hexamethylene-adipamide; polyesters such as polymethyleneterephthalates; polycarbonates such as those prepared from bisphenol-A and phosgene; polyacetals; polyethylene oxide; and polyacrylics such as polyacrylonitrile; polyphenyleneoxides such as those prepared from 2,6-dimethylphenol and the like. Particularly preferred polymers for the compositions of this invention are those normally solid polymers of alpha-olefins having up to 3 carbon atoms, e.g., ethylene-propylene and their copolymers.

The stabilized polymers of the present invention have utility in the normal uses for which plastics are employed and particularly useful for film and fiber. Compounds of this invention may be incorporated in the polymeric substance during the usual processing operations, for example, by hot milling, the composition then being extruded, pressed, blow molded or the like into films, fibers, filaments, hollow spheres and the like. Where the polymer is prepared from a liquid monomer as in the case of styrene, the stabilizer may be dispersed or dissolved in the monomer prior to polymerization or curing.

The compounds of this invention, in addition to their ability to stabilize synthetic polymers against ultraviolet light are also effective in protecting the synthetic polymers against thermal and oxidative degradation, especially when used in conjunction with 0.01 to 5% by weight of polymer of a sulfur compound such as dilaurylthiodipropionate and distearylthiodipropionate.

In addition to the actinic stabilizers described, the plastic compositions may contain other additives such as plasticizers, pigments, fillers, dyes, glass or other fibers, thermal antioxidants, and the like. For example in most applications, it is desirable to incorporate into the resin composition, sufficient thermal antioxidants to protect the plastic against thermal and oxidative degradation. The amount of antioxidant required will be comparable to that of the actinic stabilizer. Namely, from about 0.005% to 5% and preferably from 0.01% to 2% by weight. Representative of such antioxidants are phosphite esters, such as triphenylphosphite and dibutylphosphite and alkyl arylphosphites such as dibutylphenylphosphite, and the like.

The best results are obtained with the preferred class of thermal antioxidants, the hindered phenols. These compounds have been found to provide the best thermal stabilization with the least discoloration in the compositions of the invention. Typical of these phenolic antioxidants include the following:

1. Phenolic compounds having the general formula

wherein
Q is

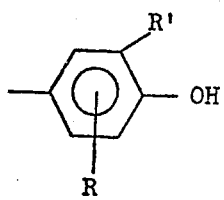

A is — $CR(COOR'')_2$

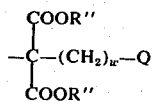

R is hydrogen or lower alkyl
R' is lower alkyl
R'' is alkyl group having from 6–24 carbon atoms
w is an integer from 0 to 4.

Illustrative examples of the compounds shown above are
di-n-octadecyl α-(3,5-di-t-butyl-4-hydroxybenzyl)malonate
di-n-octadecyl α-(3-t-butyl-4-hydroxy-5-methyl-benzyl)malonate which is disclosed in the Netherlands Pat. No. 6,711,199, Feb. 19, 1968
di-n-octadecyl-α,α'bis-(3-t-butyl-4-hydroxy-5-methylbenzyl)malonate which is disclosed in the Netherlands Pat. No. 6,803,498, Sept. 18, 1968.

2. Phenolic compounds having the general formula

Illustrative examples of the compounds shown above are
2,6-di-t-butyl-p-cresol
2-methyl-4,6-di-t-butylphenol and the like.

3. Phenolic compounds having the formula

2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5methylphenol)
2,2'-methylene-bis[6-(1-methylcyclohexyl)-4-methylphenol] and the like.

4. Phenolic compounds having the formula

Illustrative examples of such compounds are
2,5-di-t-butylhydroquinone
2,6-di-t-butylhydroquinone
2,5-di-t-butyl-4-hydroxyanisole 5. Phenolic compounds having the formula

Illustrative examples of such compounds are
4,4'-thiobis-(2-t-butyl-5-methylphenol)
4,4'-thiobis-(2-t-butyl-6-methylphenol)
2,2'-thiobis-(6-t-butyl-4-methylphenol)

6. Phenolic compounds having the formula

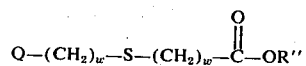

Illustrative examples of such compounds are
octadecyl-(3,5-dimethyl-4-hydroxybenzylthio)-acetate
dodecyl-(3,5-di-t-butyl-4-hydroxybenzylthio)propionate 7. Phenolic compounds having the formula

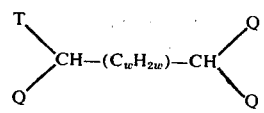

wherein T is hydrogen
R or Q as defined above.

Illustrative examples of such compounds are
1,1,3-tris(3,5-dimethyl-4-hydroxyphenyl)-propane
1,1,3-tris(5-t-butyl-4-hydroxy-2-methylphenyl)-butane
1,1,5,5-tetrakis-(3'-t-butyl-4'-hydroxy-6'-methylphenyl)-n-pentane 8. Phenolic compounds having the formula

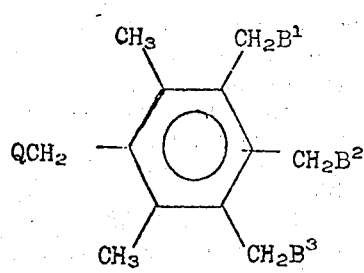

wherein $B^1$, $B^2$ and $B^3$ are hydrogen, methyl or Q, provided that when $B^1$ and $B^3$ are Q then $B^2$ is hydrogen or methyl and when B² is Q then B¹ and B³ are hydrogen or methyl.

Illustrative examples of such compounds are
1,4-di(3,5-di-t-butyl-4-hydroxybenzyl)-2,3,5,6-tetramethylbenzene
1,3,5-tri(3,5-di-t-butyl-4-hydroxybenzyl)-2,4,6-trimethylbenzene 9. Phenolic compounds having the formula

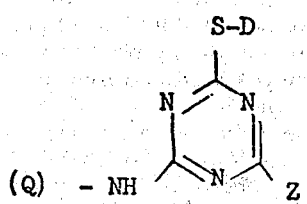

wherein Z is NHQ, —S—D or —O—Q

D is alkyl group having from 6–12 carbon atoms or —($C_wH_{2w}$)—S—R''

Illustrative examples of such compounds are
2,4-bis-(n-octylthio)-6-(3,5-di-t-butyl-4-hydroxyaniline)-1,3,5-triazine
6-(4-hydroxy-3-methyl-5-t-butylanilino)-2,4-bis-(n-octylthio)-1,3,5-triazine
6-(4-hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.

The above phenolic triazine stabilizers are more fully described in U.S. Pat. No. 3,255,191.

10. Phenolic compounds having the formula

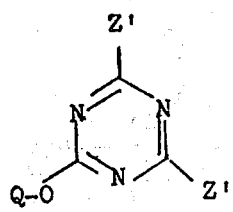

wherein Z' is —O—Q, —S—D or —S—($C_wH_{2w}$)—SD

Illustrative examples of such compounds are
2,3-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine.
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-triazine 6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine
2,4-bis-(4-hydroxy-3,5-di-t-butylphenoxy)-6-(n-dodecylthioethylthio)-1,3,5-triazine.

The above phenolic triazine stabilizers are more fully described in U.S. Pat. No. 3,255,191.

11. Phenolic compounds having the formula

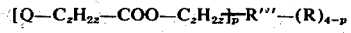

[Q—$C_zH_{2z}$—COO—$C_zH_{2z}$]$_p$—R'''—(R)$_{4-p}$ wherein p is an integer from 2 to 4 and R''' is a tetravalent radical selected from aliphatic hydrocarbons having from 1 to 30 carbon atoms
aliphatic mono and dithioethers having from 1 to 30 carbon atoms
aliphatic mono and diethers having from 1 to 30 carbon atoms and
z is an integer from 0 to 6.

Illustrative examples of such compounds are

Sub-class I n-Octadecyl 3-(3,5-di-t-butyl-4-hydroxyphenyl)-propionate
n-Octadecyl 2-(3,5-di-t-butyl-4-hydroxyphenyl)-acetate
n-Octadecyl 3,5-di-t-butyl-4-hydroxybenzoate
n-Hexyl 3,5-di-t-butyl-4-hydroxyphenylbenzoate
n-Dodecyl 3,5-di-t-butyl-4-hydroxyphenylbenzoate
Neo-dodecyl 3-(3,5-di-t-butyl-4-hydroxyphenyl)-propionate
Dodecyl β-(3,5-di-t-butyl-4-hydroxyphenyl)-propionate
Ethyl α-(4-hydroxy-3,5-di-t-butylphenyl)-isobutyrate
Octadecyl α-(4-hydroxy-3,5-di-t-butylphenyl)-isobutyrate
Octadecyl α-(4-hydroxy-3,5-di-t-butylphenyl)-propionate

Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxy benzoate
2-(2-hydroxyethylthio)ethyl 3,5-di-t-butyl-4-hydroxybenzoate
2,2'-Thiodiethanol bis(3,5-di-t-butyl-4-hydroxyphenyl)acetate
Diethyl glycol bis-[3,5-di-t-butyl-4-hydroxyphenyl)-proprionate]
2-(n-octadecylthio)ethyl 3-(3,5-di-t-butyl-4-hydroxyphenyl)propionate
2,2'-Thiodiethanol-bis-3-(3,5-di-t-butyl-4-hydroxyphenyl)propionate Stearamido N,N-bis-[ethylene 3-(3,5-di-t-butyl-4-hydroxyphenyl)propionate]

n-Butylimino N,N-bis-[ethylene 3-(3,5-di-t-butyl-4-hydroxyphenyl)proprionate]

2-(2-stearoyloxyethylthio)ethyl 3,5-di-t-butyl-4-hydroxybenzoate 2-(2-hydroxyethylthio)ethyl 7-(3-methyl-5-t-butyl-4-hydroxyphenyl)heptanoate 2-(2-stearoyloxyethylthio)ethyl 7-(3-methyl-5-t-butyl-4-hydroxyphenyl)heptanoate Sub-class III 1,2-propylene glycol bis-[3-(3,5-di-t-butyl-4-hydroxyphenyl)propionate]

Ethylene glycol bis-[3-(3,5-di-t-butyl-4-hydroxyphenyl)propionate]

Neopentylglycol bis-[3-(3,5-di-t-butyl-4-hydroxyphenyl)propionate]

Ethylene glycol bis-(3,5-di-t-butyl-4-hydroxyphenylacetate)

Glycerine-1-n-octadecanoate-2,3-bis-(3,5-di-t-butyl-4-hydroxyphenylacetate

Pentaethylthritol-tetrakis-[3-(3,5-di-t-butyl-4-hydroxyphenyl)propionate]

1,1,1-trimethylol ethane-tris-3-(3,5-di-t-butyl-4-hydroxyphenyl)propionate

Sorbitol hexa-[3-(3,5-di-t-butyl-4-hydroxyphenyl)-propionate 1,2,3-butanetriol tris-[3-(3,5-di-t-butyl-4-hydroxyphenyl)propionate]

2-hydroxyethyl 7-(3-methyl-5-t-butyl-4-hydroxyphenyl)heptanoate 2-stearoyloxyethyl 7-(3-methyl-5-t-butyl-4-hydroxyphenyl)heptanoate 1,6-n-hexanediol-bis[(3',5'-di-t-butyl-4-hydroxyphenyl)propionate]

The above phenolic ester stabilizers of sub-classes I, II and III are more fully described in U.S. Pat. No. 3,330,859, and U.S. Pat. No. 3,644,482, respectively.

12. Phenolic compounds having the formula

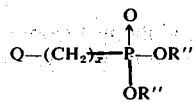

where x is an integer of 1 or 2.

Illustrative examples of such compounds are

Di-n-octadecyl 3,5-di-t-butyl-4-hydroxybenzylphosphonate

Di-n-octadecyl 3-t-butyl-4-hydroxy-5-methylbenzylphosphonate

Di-n-octadecyl 1-(3,5-di-t-butyl-4-hydroxyphenyl)-ethanephosphonate

Di-n-tetradecyl 3,5-di-t-butyl-4-hydroxybenzylphosphonate

Di-n-hexadecyl 3,5-di-t-butyl-4-hydroxybenzylphosphonate

Di-n-docosyl-3,5-di-t-butyl-4-hydroxybenzylphosphonate

Di-n-octadecyl 3,5-di-t-butyl-4-hydroxybenzylphosphonate

The above di-(higher)alkyl phenolic phosphonates are more fully described in U.S. Pat. No. 3,281,505.

13. Phenolic compounds having the formula

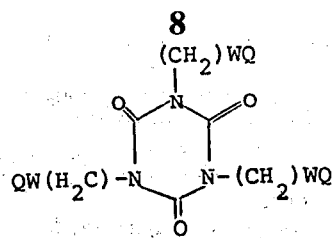

wherein W and Q are defined above.

Illustrative examples of such compounds are:

tris-(3,5-di-t-butyl-4-hydroxybenzyl)isocyanurate tris-(3-t-butyl-4-hydroxy-5-methylbenzyl)isocyanurate The above hydroxyphenylalkenyl isocyanurates are more fully described in U.s. Pat. NO. 3,531,483.

The above phenolic hydrocarbon stabilizers are known and many are commercially available.

While any of the above mentioned antioxidants can be useful in combination with the ultraviolet light stabilizers of this invention, the preferred antioxidants consist of the hindered phenols in groups 1, 8, 9, 10, 11, 12 and 13 as mentioned above. The most preferred hindered phenols are those of groups 1, 9, 11, 12 and 13.

The compounds of formula I may be prepared by reacting a substituted piperazine dione of the formula

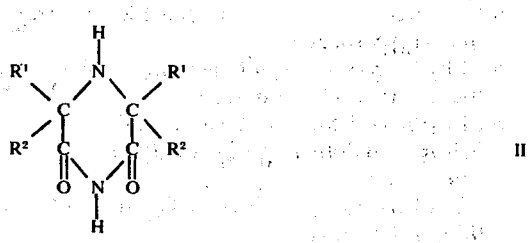

wherein $R^1$ and $R^2$ are as defined above, with a 2,6-dialkylsubstituted hydroxyphenylalkylhalide of the formula

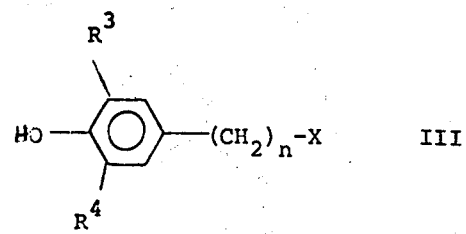

wherein $R^3$ and $R^4$ are as defined above and X is bromine, chlorine or iodine.

The alkylation reaction is carried out by first preparing the alkali or alkaline earth metal salt of the compound of formula II and reacting the resulting salt with the appropriate organic halide of formula III in a solvent such as dimethylformamide, isopropanol, or acetone at about 75°C.

The alternative procedure in preparing the compounds of formula I wherein n is equal to 1 is to react the compound of formula II with a 2,6-dialkyl-4-dimethylaminophenol in a solvent such as dimethylformamide at 125°C.

Compounds of formula II, wherein $R^1$ and $R^2$ form a mono-cyclic ring with the carbon to which they are attached, may be prepared by the self condensation of a cycloalkyl amino cyanohydrin according to the proecdure described by R. Sudo and S. Ichihera, Bull.

Chem. Soc. Japan 36 34 (1963) and subsequent hydrolysis as described by E. F. J. Duynstee et al., Recueil de Chemie des Pays-Bas 87 945 (1968). The cycloalkylamino cyanohydrin is formed by the sequential addition of hydrogen cyanide and ammonia to a cycloalkanone as described by W. E. Noland, R. J. Sundberg and M. L. Michaelson, J. Org. Chem. 28 3576 (1963). Although the above references deal specifically with the cycloalkyl case, the procedures therein have been found to be operable in the alkyl case as well, for example substitution of an alkanone such as acetone for the cycloalkanone such as cyclohexanone in the above procedure.

The following examples, presented for illustration and not limitation, will further serve to typify the nature of the present invention.

EXAMPLE 1

1-Aminocyclohexanecarbonitrile

In a 200 ml — 3 necked flask equipped with a stirrer, thermometer, condenser drying tube and gas inlet tube were placed 100 g. (0.8 moles) of cyclohexanone cyanohydrin and the reaction mixture was cooled with an ice bath to 15°C. Gaseous anhydrous ammonia was introduced to the reaction mixture through the gas inlet tube for 6 hours. The reaction was then stopped and allowed to stand overnight.

The next day anhydrous ammonia was again passed through the reaction mixture for 5 hours at 25°C then dry $N_2$ was passed through the reaction mixture to entrain any excess $NH_3$. The product was then dissolved in 250 ml of benzene, the benzene solution washed two times with 250 ml of water, and the solution dried over anhydrous $Na_2SO_4$. Evaporation of the benzene yielded the product which was a slightly yellow oil.

In a similar manner, 1-aminoisobutyronitrile was prepared by substituting for cyclohexanone cyanohydrin an equivalent amount of acetone cyanohydrin.

Similarly, 1-amino-2-methyl-cyclohexanecarbonitrile is prepared by substituting for cyclohexanone cyanohydrin an equivalent amount of 2-methyl-cyclohexanone cyanohydrin.

EXAMPLE 2

Bis-(1-cyanocyclohexyl)amine

In a 1-necked round bottomed flask equipped with a capillary nitrogen inlet and an air condenser was placed 48.2 g. (0.39 moles) of 1-aminicyclohexane carbonitrile. The reaction mixture was heated in an oil bath to a bath temperature of 75°–100° over 1 hour and placed under a vacuum of using a water aspirator. The reaction was continued for 24 hours, cooled to room temperature, the vacuum released, and the crystalline mass was triturated with ether and filtered by suction, yielding 19.1 g. of white crystals, m.p. 133°–138°C.

In a similar manner, bis(1-cyanoisopropylamine) was prepared by substituting for 1-aminocyclohexane carbonitrile an equivalent amount of 1-aminoisobutyronitrile.

Similarly, bis-(1-cyano-2-methylcyclohexyl)amine is prepared by substituting for 1-aminocyclohexanecarbonitrile an equivalent amount of 1-amino-2-methyl cyclohexanecarbonitrile.

EXAMPLE 3

7,15-diazadispiro[5,1,5,3]hexadecane-14,16-dione

To 406 g. of 96% $H_2SO_4$ contained in a 500 ml 3-necked flask equipped with a stirrer, thermometer and powder funnel was added with stirring and cooling, 30.0 g of powdered bis-(1-cyanocyclohexyl)amine over about a 2 hour period. The temperature of the reaction mixture was maintained at 0°–5° during the addition by using an ice bath. The reaction mixture was allowed to warm to room temperature and to stir overnight. The reaction mixture was then heated to 100°C for one hour, then cooled to approximately 15°C and poured onto 3000 g. of ice. The aqueous mixture was neutralized to pH 7 by the addition of approximately 800 ml of 10N NaOH. The resulting precipitate was collected by suction filtration, washed well with water, and dried in a vacuum oven, yielding a white powder, m.p. 155°–160°C.

In a similar manner, 2,2,6,6-tetramethyl-3,5-diketopiperazine was prepared by substituting for bis(1-cyanohexyl)amine an equivalent amount of bis(1-cyanisopropylamine).

Similarly, 1,9-dimethyl-7,15-diazadispiro[5,1,5,3]hexadecane-14,16-dione is prepared by substituting for bis-(1-cyanocyclohexyl)amine an equivalent amount of bis-(1-cyano-2-methylcyclohexyl)amine.

EXAMPLE 4

15-(3',5'-di-t-butyl-4'-hydroxybenzyl)-7,15-diazadispiro[5,1,5,3]hexadecane-14,16-dione In a 200 ml 3-necked flask equipped with a stirrer, thermometer, condenser, drying tube and $N_2$ inlet was placed a solution of 6.3g (0.025 moles) of 7,15-diazadispiro[5,1,5,3]hexadecane-14,16-dione and 6.9g (0.0263 moles) of 2,6-di-t-butyl-4-hydroxybenzyldimethylamine in 100 ml of dimethyl formamide. The reaction flask was heated slowly to 125°C with stirring under $N_2$ by an oil bath. The reaction mixture was maintained at 125°C for 28 hours and then cooled to room temperature. The reaction mixture was taken up in 300 ml of ether and washed four times with 100 ml of water. To the ether solution was added 50 ml of concentrated HCl affording a precipitate which was filtered with suction. The product was taken up in water and NaOH added until the solution was basic. The water solution was extracted with ether, the ether extracts combined and dried over anhydrous $Na_2SO_4$. The ether solution was evaporated, yielding light yellow crystalline material, which was recrystallized from heptane giving white crystals, m.p. 122°–125°C.

By following the above procedure, and substituting for 7,15-diazadispiro[5,1,5,3]hexadecane-14,16-dione an equivalent amount of:

a. 2,2,6,6-tetramethyl-3,5-diketopiperazine
b. 1,9-dimethyl-7,15-diazadispiro[5,1,5,3]hexadecane-14,16-dione there is respectively obtained the following compounds a. 4(3',5'-di-t-butyl-4'-hydroxybenzyl)-2,2,6,6-tetramethyl-3,5-diketopiperazine; m.p. 118°–121°C
b. 15-(3',5'-di-t-butyl-4'-hydroxybenzyl)-1,9-dimethyl-7,15-diazadispiro[5,1,5,3]hexadecane-14,16-dione.

EXAMPLE 5

15-(3',5'-di-t-butyl-4'-hydroxybenzyl)7,15-diazadispiro[5,1,5,3]hexadecane-15,16-dione To a solution of 10.0g (0.04 moles) of 7,15-diazadispiro[5,1,5,3]hexadecane-14,16-dione in 150 ml of anhydrous methanol in a 500 ml flask is added 2.6g of 86% KOH (0.04 moles) and the mixture is shaken until solution is obtained. The reaction mixture is evaporated to dryness under reduced pressure. The residue is transferred to a 300 ml 3-necked flask equipped with a stirrer, thermometer, condenser with drying tube, dropping funnel and nitrogen inlet tube with the aid of a small amount of dry DMF. To the potassium imide salt, under a nitrogen atmosphere, is added 150 ml of dry DMF. To the stirred solution is added dropwise a solution of 10.2g (0.04 moles) of 3,5-di-t-butyl-4-hydroxybenzyl chloride in 50 ml of dry DMF. The reaction mixture is heated to 75°C for 3 hours, then cooled and allowed to stir at room temperature for 16 hours. The reaction mixture is taken up in 500 ml of ether and washed with water. To the ether solution is added 50 ml of concentrated HCl affording a precipitate which is collected by suction filtration. The product is taken up in water and NaOH added until the solution is basic. The water solution is extracted with ether, the ether extracts combined and dried over anhydrous $Na_2SO_4$. The ether solution is evaporated yielding the product which is recrystallized from heptane.

By essentially following the above procedure, and substituting for the reactants used, i.e., 7,15-diazadispiro[5,1,5,3]hexadecane-14,16-dione and 3,5-di-t-butyl-4-hydroxybenzyl chloride, an equivalent amount of the following reactants:

a. 7,15-diazadispiro[5,1,5,3]hexadecane-14,16-dione + 3-t-butyl-5-methyl-4-hydroxybenzyl chloride
b. 7,15-diazadispiro[5,1,5,3]hexadecane-14,16-dione + β-(3',5'-di-t-butyl-4'-hydroxyphenethyl)-chloride
c. 7,15-diazadispiro[5,1,5,3]hexadecane-14,16-dione + 3-(3',5'-di-t-butyl-4'-hydroxyphenyl)propyl chloride
d. 7,15-diazadispiro[5,1,5,3]hexadecane-14,16-dione + 4-(3',5'-di-t-butyl-4'-hydroxyphenyl)butyl chloride
e. 2,2,6,6-tetramethyl-3,5-diketopiperazine + 2-methyl-6-t-octyl-4-hydroxybenzyl chloride
f. 7,15-diazadispiro[5,1,5,3]hexadecane-14,16-dione + 3,5-di-t-octyl-4-hydroxybenzyl chloride there is respectively obtained the following compounds:

a. 15-(3'-t-butyl-5'-methyl-4'-hydroxybenzyl)7,15-diazadispiro[5,1,5,3]hexadecane-14,16-dione
b. 15-β-(3',5'-di-t-butyl-4'-hydroxyphenethyl) 7,15-diazadispiro[5,1,5,3]hexadecane-14,16-dione m.p. 140°–144°
c. 15-(3'-(3'',5''-di-t-butyl-4''-hydroxyphenylpropyl)-7,15-diazadispiro[5,1,5,3]hexadecane-14,16-dione
d. 15-(4'-(3'',5''-di-t-butyl-4''-hydroxyphenylbutyl)-7,15-diazadispiro[5,1,5,3]hexadecane-14,16-dione)
e. 4(3'-methyl-5'-t-octyl-4'-hydroxybenzyl)-2,2,6,6-tetramethyl-3,5-diketopiperazine
f. 15-(3',5'-di-t-octyl-4'-hydroxybenzyl)7,15-diazadispiro[5,1,5,3]hexadecane-14,16-dione

EXAMPLE 6

Artificial Light Exposure Test

Deterioration of most polymers caused by ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers using an artifical light exposure device is described below:

a. Sample Preparation 5 mil Film — Unstabilized polypropylene powder (Hercules Profax 6501) is thoroughly blended with the indicated amounts of additives. The blended material is then milled on a two roll mill for 5 minutes at 182°C. The milled sheet is then compression molded at 220°C into 5 mil thick film under a pressure of 175 psi and water cooled in the press.

b. Testing Method

This test is conducted in a FS/BL unit, basically of the American Cyanamid design, which consists of 40 tubes of alternating fluorescent sunlamps and black lights (20 of each). The 5 mil sample film which are mounted on 3 inches × 2 inches IR card holders with ¼ inch × 1 inch windows and are placed on a rotating drum 2 inches from the bulbs in the FS/BL unit. The time in hours is noted for the development of 0.5 carbonyl absorbance units as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight per cent based on the weight of the polymer.

Table I

| Formulation* | Time in Hours to .5 Carbonyl Absorbance Units |
|---|---|
| .5% 15(3',5'-di-t-butyl-4-hydroxybenzyl)-7,15-diazadispiro [5,1,5,3]hexadecane-14,16-dione | 390 |
| .5% 4-(3',5'-di-t-butyl-4'-hydroxybenzyl)2,2,6,6-tetramethyl piperazine 3,5-dione | 685 |
| 0.5% 15-β-(3',5'-di-t-butyl-4'-hydroxyphenethyl)7,15-diazadispiro [5,1,5,3]hexadecane 14,16-dione | 440 |
| Control* | 225 |

*The sample tested and the control contains 0.2% of (di-octadecyl(3,5-di-t-butyl-4-hydroxybenzyl) phosphonate which is an antioxidant which prevents oxidative degradation of polypropylene during processing.

Other hindered phenolic antioxidants may be used in place of di-octadecyl(3,5-di-t-butyl-4-hydroxybenzyl)-phosphonate in the above mentioned composition for example, di-n-octadecyl α-(3-t-butyl-4-hydroxy-5-methylbenzyl)malonate, 2,4-bis-(n-octylthio)-6-(3,5-di-t-butyl-4-hydroxyanilino)-1,3,5-triazine, octadecyl 3-(3',5'-di-t-butyl-4'-hydroxyphenyl)propionate, pentaethylthritol-tetrakis{3-(3,5-di-t-butyl-4-hydroxyphenyl) propionate}, tris-(3,5-di-t-butyl-4-hydroxybenzyl)isocyanurate, respectively.

EXAMPLE 7 a. A composition comprising acrylonitrilebutadienestyrene terpolymer and 1% by weight of 15-(3'-(3'',5''-di-t-butyl-4''-hydroxyphenylpropyl)-7,15-diazadispiro[5,1,5,3]hexadecane-14,16-dione resists embrittlement due to exposure to ultraviolet light longer than one which does not contain the stabilizer.

b. A composition comprising polyurethane prepared from toluene diisocyanate and alkylene polyols and 1.0% by weight of 4(3'-methyl-5'-t-octyl-4'-hydroxybenzyl)-2,2,6,6-tetramethyl-3,5-diketopiperazine is more stable to sunlight, under fluorescent sunlamps, black lights and fluorescent lights than the unformulated polyurethane.

c. A composition comprising a polycarbonate prepared from bisphenol-A and phosgene and 1% by weight of 15-(4'-(3'',5''-di-t-butyl-4''-hydroxyphenylbutyl)-7,15-diazadispiro[5,1,5,3]hexadecane-14,16-dione resists discoloration due to exposure to ultraviolet light longer than one which does not contain the stabilizer.

EXAMPLE 8 a. A stabilized linear polyethylene is prepared by incorporating therein 0.5% by weight of 15-(3',5'-di-t-butyl-4'-hydroxybenzyl)-7,15-diazadispiro[5,1,5,3]hexadecane-14,16-dione. The stabilized compositions resist embrittlement due to exposure to ultraviolet light longer than one which does not contain the stabilizer.

b. A stabilized polyamide (nylon 6,6) is prepared by incorporating therein 0.1% by weight of 4(3', 5'-di-t-butyl-4'-hydroxybenzyl)-2,2,6,6-tetramethyl-3,5-diketopiperazine. The light stability of the stabilized composition is superior to that of an unstabilized polyamide.

c. A stabilized polyphenylene oxide polymer (prepared by polymerizing 2,6-dimethylphenol) is prepared by incorporating therein 0.5% by weight 15-(3'-t-butyl-5'-methyl-4'-hydroxybenzyl)-7,15-diazadispiro[5,1,5,3]hexadecane-14,16-dione. The stabilized compositions resist embrittlement due to exposure to ultraviolet light longer than one which does not contain the stabilizer.

d. A stabilized crystalline polystyrene is prepared by incorporating therein 0.1% by weight of 15-β-(3',5'-di-t-butyl-4'-hydroxyphenethyl)7,15-diazadispiro[5,1,5,3]hexadecane-14,16-dione. The stabilized compositions resist embrittlement due to exposure to ultraviolet light longer than one which does not contain the stabilizer.

EXAMPLE 9

High impact polystyrene resin containing elastomer (i.e., butadiene-styrene) is stabilized against loss of elongation properties due to exposure to ultraviolet light by incorporation of 0.3% by weight of 15-(3',5'-di-t-octyl-4'-hydroxybenzyl)-7,15-diazadispiro[5,1,5,3]hexadecane-14,16-dione.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25 mil). The sheets are then cut into strips approximately 4 × 0.5 inches. A portion of these strips is then measured for percent of elongation in the Instron Tensile Testing Apparatus (Instron Engineering Corporation, Quincy, Massachusetts). The remaining portion of the strips are placed in an FS/BL chamber according to Example 6 (b) except that the time to 50% reduction in elongation is measured. The stabilized polystyrene resin retains its elongation property longer than the unstabilized resin.

Similar results are obtained when an equivalent amount of the following stabilizers are used in place of the above mentioned stabilizer.

a. 0.1% by weight of 4(3',5'-di-t-butyl-4'-hydroxybenzyl)-2,2,6,6-tetramethyl-3,5-diketopiperazine b. 0.5% by weight of 15-(3',5'-di-t-butyl-4'-hydroxybenzyl)-1,9-dimethyl-7,15-diazadispiro[5,1,5,3]hexadecane-14,16 -dione c. 0.1% by weight of 15-(3'-t-butyl-5'-methyl-4'-hydroxybenzyl)7,15-diazadispiro[5,1,5,3] hexadecane-14,16-dione d. 0.5% by weight of 15-β-(3,5-di-t-butyl-4-hydroxyphenethyl)7,15-diazadispiro[5,1,5,3]hexadecane-14,16-dione e. 1% by weight of 15-{3'-(3'',5''-di-t-butyl-4''-hydroxyphenyl)propyl}-7,15-diazadispiro[5,1,5,3]hexadecane-14,16-dione f. 0.5% by weight of 15-{4'-(3'',5''-di-t-butyl-4''-hydroxyphenyl)butyl}-7,15-diazadispiro[5,1,5,3]hexadecane-14,16-dione g. 0.5% by weight of 4(3'-methyl-5'-t-octyl-4-hydroxybenzyl)-2,2,6,6-tetramethyl-3,5-diketopiperazine.

Antioxidants may also be incorporated into each of the above mentioned compositions for example, di-n-octadecyl-α,α'-bis(3-t-butyl-4-hydroxy-5-methylbenzyl) malonate, 2,4-bis(4-hydroxy-3,5-di-t-butylphenoxy)-6-(n-octylthioethylthio)-1,3,5-triazine, 2,4-bis(3,5-di-t-butyl-hydroxyphenoxy)-6-(n-octylthio)-1,3,5-triazine di-n-octadecyl 3,5-di-t-butyl-4-hydroxybenzyl phosphonates and octadecyl 3(3',5'-di-t-butyl-4'-hydroxyphenyl)propionate respectively.

What is claimed is:

1. A compound of the formula

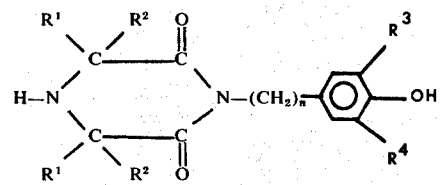

wherein
R¹ and R² are independently of each other methyl or ethyl;
n is an integer of from 1 to 4; and
each of R³ and R⁴ is the same or different (lower)alkyl group having from 1 to 8 carbon atoms, wherein at least one of said alkyl groups is branched on the α carbon atom.

2. A compound according to claim 1 wherein R¹ and R² is a methyl group; and R³ and R⁴ is a tertiary butyl group.

3. A compound according to claim 1 which is 4(3',5'-di-t-butyl-4'-hydroxybenzyl)-2,2,6,6-tetramethyl-3,5-diketopiperazine.

4. A composition of matter stabilized against ultraviolet deterioration consisting essentially of synthetic organic polymer normally subject to ultraviolet deterioration containing from 0.01 to 2% by weight of the polymer of a stabilizing compound according to claim 1.

5. A composition of matter stabilized against ultraviolet deterioration consisting essentially of a synthetic organic polymer normally subject to ultraviolet deterioration containing a stabilizing amount of a hindered phenolic antioxidant and from 0.01 to 2% by weight of the polymer of a compound according to claim 1.

* * * * *